(12) United States Patent
Ward et al.

(10) Patent No.: US 6,922,829 B2
(45) Date of Patent: Jul. 26, 2005

(54) METHOD OF GENERATING PROFILE-OPTIMIZED CODE

(75) Inventors: Alan S. Ward, Sugarland, TX (US); Reid E. Tatge, Richmond, TX (US); Jonathan F. Humphreys, Missouri City, TX (US); David H. Bartley, Dallas, TX (US); Paul C. Fuqua, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 605 days.

(21) Appl. No.: 09/761,152

(22) Filed: Jan. 17, 2001

(65) Prior Publication Data

US 2001/0032332 A1 Oct. 18, 2001

Related U.S. Application Data

(63) Continuation-in-part of application No. 09/668,794, filed on Sep. 22, 2000, and a continuation-in-part of application No. 09/510,217, filed on Feb. 22, 2000, and a continuation-in-part of application No. 07/510,216, filed on Feb. 22, 2000.
(60) Provisional application No. 60/158,363, filed on Oct. 12, 1999.

(51) Int. Cl.[7] .............................. G06F 9/45; G06F 9/44
(52) U.S. Cl. ....................................... 717/154; 717/130
(58) Field of Search ................................ 717/128–131, 717/140–161; 706/15, 20, 26–29; 345/440; 707/3; 711/144; 708/142

(56) References Cited

U.S. PATENT DOCUMENTS

| | | | | |
|---|---|---|---|---|
| 5,189,633 A | * | 2/1993 | Bonadio | 708/142 |
| 5,353,410 A | * | 10/1994 | Macon et al. | 711/144 |
| 5,535,391 A | * | 7/1996 | Hejlsberg et al. | 717/140 |
| 5,815,720 A | * | 9/1998 | Buzbee | 717/158 |
| 5,933,643 A | * | 8/1999 | Holler | 717/158 |
| 5,966,538 A | * | 10/1999 | Granston et al. | 717/158 |
| 5,978,795 A | * | 11/1999 | Poutanen et al. | 707/3 |
| 6,047,277 A | * | 4/2000 | Parry et al. | 706/20 |
| 6,295,641 B1 | * | 9/2001 | Beadle et al. | 717/148 |
| 6,360,360 B1 | * | 3/2002 | Bates et al. | 717/160 |
| 6,427,234 B1 | * | 7/2002 | Chambers et al. | 717/140 |
| 6,509,898 B2 | * | 1/2003 | Chi et al. | 345/440 |

* cited by examiner

Primary Examiner—Kakali Chaki
Assistant Examiner—Trent J Roche
(74) Attorney, Agent, or Firm—W. James Brady, III; Frederick J. Telecky, Jr.

(57) ABSTRACT

A method of generating profiled optimized code using user interface (17) that allows a user to visually understand, inspect, and manipulate a compiled application program as a function of compiler options, such as, code size and speed, is provided. A program (11) is compiled in a compiler (13) with two or more compiler options such as size and speed and the resulting executables (14) are profiled (15). The results of the profiles (19) are analyed in a solver (21) for generating sets of useful solutions (23) wherein the sets have methods of compiling at the function level. The useful solutions (23) are displayed (18) at the user interface (17) to allow the user to visually understand, inspect and manipulate compiler options to select compiler options (13a) for the program.

15 Claims, 7 Drawing Sheets

| Function | Cycles | Size | Option Set | Options |
|---|---|---|---|---|
| decoder_homing_fra... | 26 | 80 | Size | -o3-oi0-ms2 |
| rx_dtx | 99 | 900 | Minimum Size | -o3-oi0-ms3 |
| D_plfs_5 | 641 | 1716 | Minimum Size | -o3-oi0-ms3 |
| Q_plsf_5 | 744 | 1448 | Minimum Size | -o3-oi0-ms3 |
| decoder_reset | 296 | 368 | Minimum Size | -o3-oi0-ms3 |
| Int_lpc2 | 296 | 224 | Minimum Size | -o3-oi0-ms3 |
| Lsf_wt | 770 | 236 | Minimum Size | -o3-oi0-ms3 |
| main | 2919 | 1680 | Minimum Size | -o3-oi0-ms3 |
| reset_rx_dtx | 274 | 172 | Minimum Size | -o3-oi0-ms3 |
| reset_tx_dtx | 315 | 184 | Minimum Size | -o3-oi0-ms3 |
| Enc_lag6 | 242 | 344 | Minimum Size | -o3-oi0-ms3 |
| vad_reset | 506 | 184 | Size | -o3-oi0-ms2 |
| Int_lnc | 616 | 272 | Minimum Size | -o3-oi0-ms3 |

FIG. 8 gsm51.orf

Overrides

| Function | OptionSet/Rule |
|---|---|
| Int_Pre_Process | None |
| set_sign | None |
| search_10i40 | None |
| q_p | None |
| cor_h_x | None |
| cor_h | None |
| build_code | None |
| code_10i40_35bits | None |
| Coder_12k2 | None |
| Vq_subvec_s | None |
| Vq_subvec | None |
| Lsf_wt | None |
| Q_plsf_5 | None |

Rule: ○ Smallest  ○ Fastest  ○ None

| | OptionSet | Cycles | Size | Options |
|---|---|---|---|---|
| ○ | Maximum Speed | 67480 | 6364 | -o3-oi0 |
| ○ | Aggresive Speed | 67864 | 6316 | -o3-oi0-ms0 |
| ○ | Speed | 66380 | 6492 | -o3-oi0-ms1 |
| ○ | Size | 217240 | 5048 | -o3-oi0-ms2 |
| ○ | Minimun Size | 292348 | 5056 | -o3-oi0-ms3 |

FIG. 9

Estimated:
Cycles: 414834
Size: 53024
Unprofiled Cycles: 80458
Unprofiled Size: 36388
Total Cycles: 495292
Total Size: 89412

Actual:
Cycles: 414834
Size: 53068
Unprofiled Cycles: 80532
Unprofiled Size: 36436
Total Cycles: 495366
Total Size: 89504

| Function | Estimated C... ▼ | Estimated Size | Option Set | Profiled Cycles | Profiled Size | Delta Cycle | Delta Size |
|---|---|---|---|---|---|---|---|
| search_10i40 | 66380 | 6492 | Speed | 66380 | 6516 | 0 | -24 |
| Syn_filt | 32928 | 744 | Maximum Spe... | 32928 | 744 | 0 | 0 |
| Vq_subvec | 25520 | 320 | Minimum Size | 25520 | 320 | 0 | 0 |
| Lag_max | 22404 | 708 | Maximum Spe... | 22404 | 708 | 0 | 0 |
| Vq_subvec_s | 19769 | 616 | Minimum Size | 19769 | 616 | 0 | 0 |
| Norm_Corr | 16466 | 1280 | Maximum Spe... | 16466 | 1280 | 0 | 0 |
| Coder_12k2 | 16030 | 3520 | Minimum Size | 16030 | 3520 | 0 | 0 |

METHOD OF GENERATING PROFILE-OPTIMIZED CODE

CROSS-REFERENCE TO RELATED APPLICATIONS

This application is a continuation-in-part of applications Ser. No. 09/668,794, filed Sep. 22, 2000 entitled "Method of Generating Profiled Optimized Code" of Tatge et al.; application Ser. No. 09/510,217 filed Feb. 22, 2000 entitled "User Interface For Making Compiler Tradeoffs of Ward et al.; and application Ser. No. 09/510,216 filed Feb. 22, 2000 entitled "Method of Generating Profiled Optimized Code of Bartley et al. and claims the benefit of Provisional Application No. 60/158,363, filed Oct. 12, 1999. These applications are incorporated herein by reference.

FIELD OF INVENTION

This invention relates to a method for compiling code and more particularly, to using profile data generated from sample runs compiled with different compiler options to guide the set of options to be used for each function.

BACKGROUND OF THE INVENTION

For some time, the technique of using the runtime performance of a program to guide optimizations has been discussed in the literature and occasionally implemented in production compilers. This technique is generally referred to as "profile-based optimization." The goal is to identify those paths through a program which are executed the most frequently, and to apply more aggressive optimization techniques to those critical sections of code to make them execute faster.

In an embedded environment, not only is speed important, but the size of the generated code is often a critical cost issue. Therefore, it is necessary to balance the concerns of speed versus space. Simply identifying the time-critical code and applying aggressive optimization to it is not enough. We must optimize part of the code to be fast, and part of the code to be small, while constraining the total program size so that it fits in the available target memory. The goal is to be able to speed optimize as much of the critical part of the program as possible without violating the size constraint.

It is a generally observed phenomenon that a large portion of the execution time of a program is generally spent in a small portion of the actual code. This is what makes profile-based optimization effective: it allows you to predict which parts of the code are speed critical, and to selectively apply more aggressive speed or size optimization.

Compiling for speed on a Very Long Instruction. Word (VLIW) architecture potentially leads to significant code size growth. Compiling for size on a VLIW results in significant speed degradation. If we simply compile everything for speed, the code may grow beyond what is available on the target memory. If we simply compile for space, the resulting performance is unacceptable.

Compiler optimization control flags generally work on a whole source module. The typical development scenario is to compile, run, and profile a program, then recompile modules based on the feedback provided by the profiler: compile some modules for speed, some for size.

SUMMARY OF THE INVENTION

In accordance with one embodiment of the present invention, a program is compiled with two or more sets of compiler options, and each resulting executable is profiled. The results of all the profiles are used as input to a program which will analyze the profile data, and given constraints will generate a solution which will be a list of each function in the application, and the set of compiler options to use for each function in order to satisfy the given constraints.

DETAILED DESCRIPTION

A standard compiler takes code (such as C) and compiles it, generating object code. A compiler may be controlled with compiler options so it generates code which will, for example, run as fast as possible or may be controlled to generate code which is as small as possible. The goal of this invention is to automatically choose compiler options for each function in a program to optimally balance system constraints such as size and speed. This set of options is referred to as the "solution" for the program.

Figure 1:
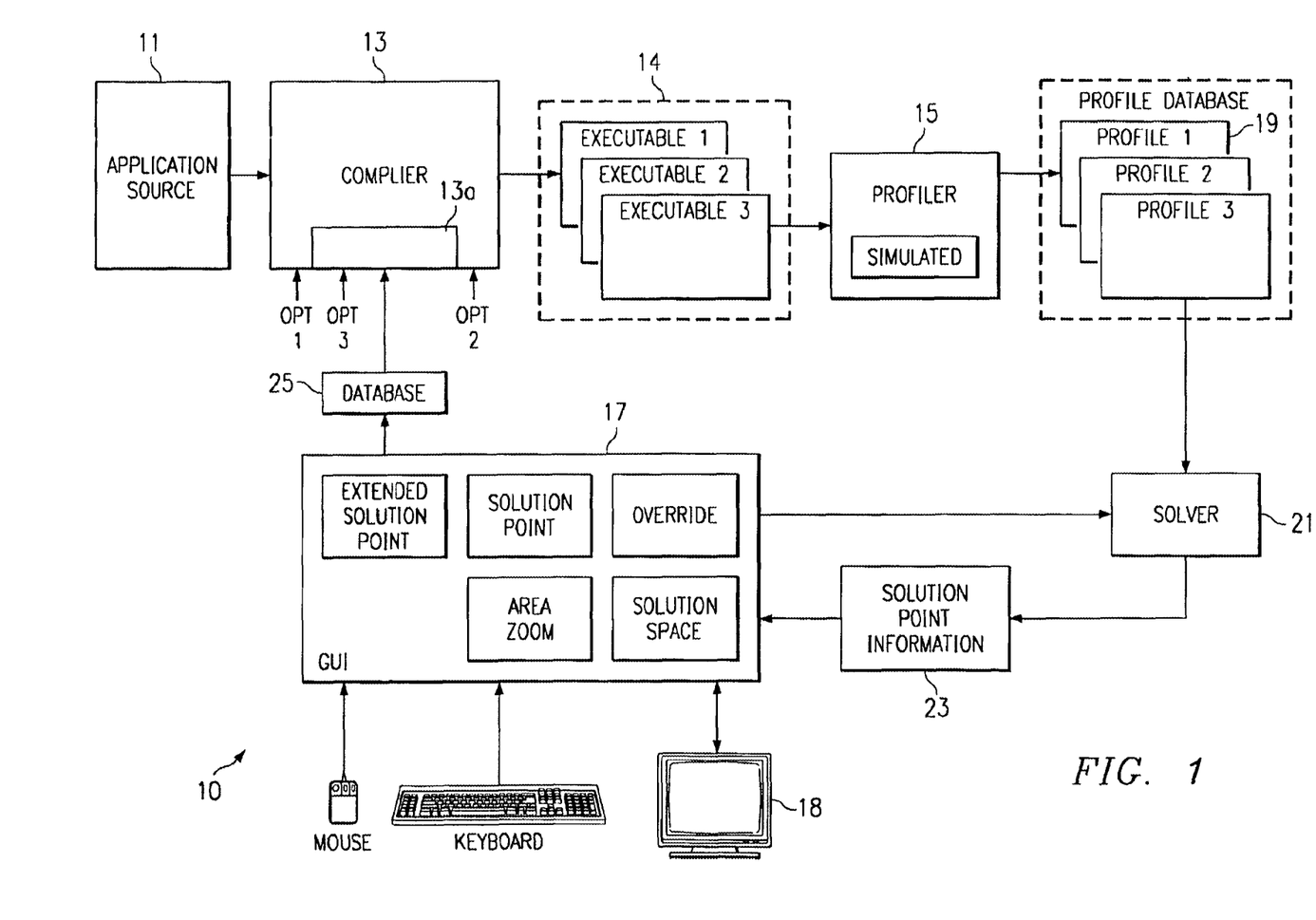
FIG. 1 illustrates the system according to one embodiment of the present invention.
Figure 2:
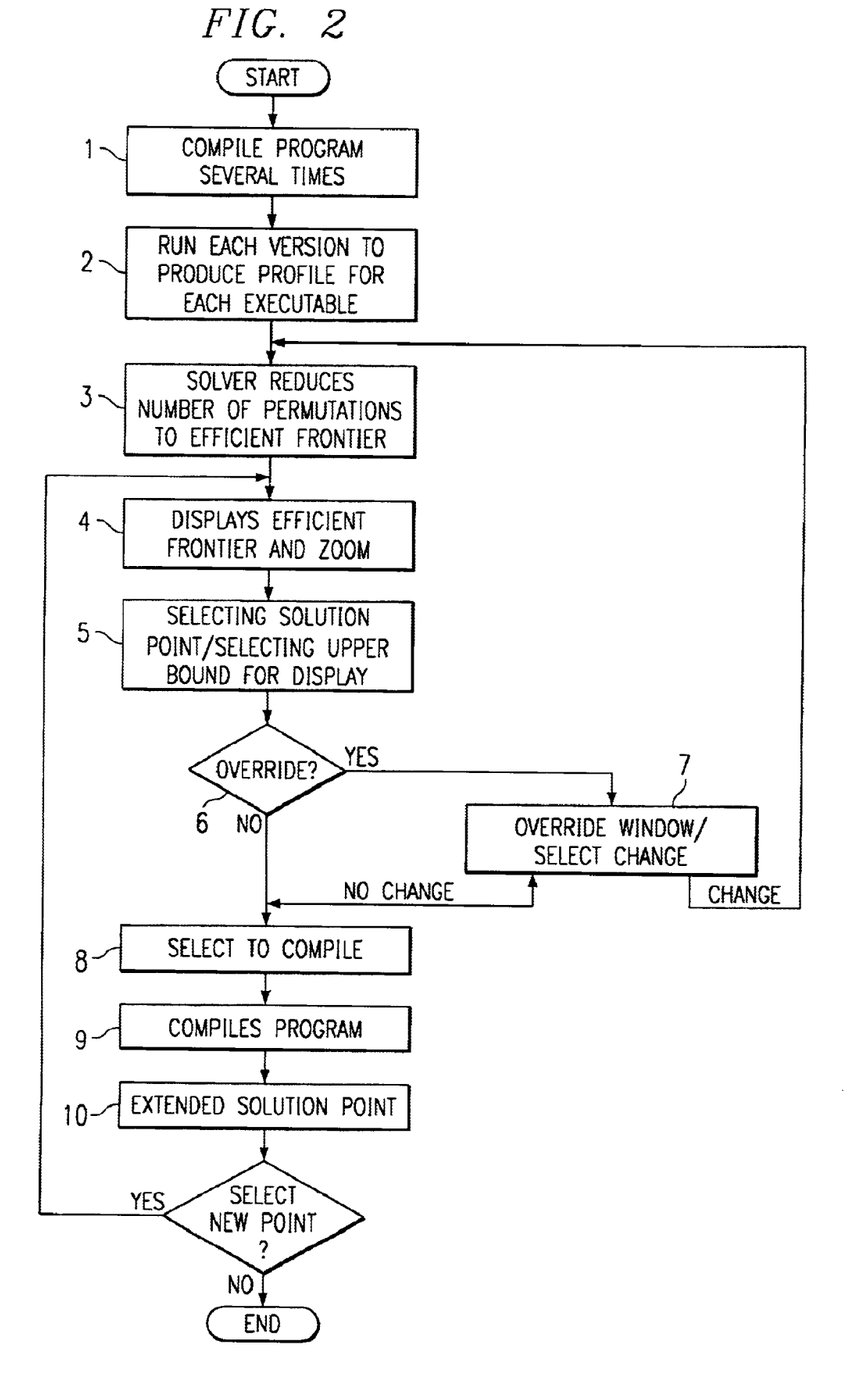
FIG. 2 illustrates the method according to one embodiment of the present invention.

Referring to FIG. 1, there is illustrated a system 10 according to one embodiment of the present invention. The method performed by the system is illustrated in FIG. 2. Code such as C code from source 11 is compiled in compiler 13 resulting in executable code. In accordance with the method and the system as illustrated in FIG. 1 and FIG. 2, the first step (Step 1) in the process is that the whole program is compiled several times in the compiler 13, each time with different compiling option. For example, the options may be for minimum size at all cost, for size with moderate speed cost, for speed, for aggressive speed or maximum speed at all cost. The option sets are chosen at control 13a by the user using a graphical user interface 17 to optimize the different performance metrics such as maximum speed or minimum size. The initial steps for generating the information used by the user interface 17 is providing said application program, and an associated database for exercising said program, providing a compiler, for compiling said application program, having compiling options. The result of the compiling step is a set of executable objects, one for each option set. The resulting executable objects are represented by executable 1, executable 2, executable 3, etc. in FIG. 1 that correspond to option 1, option 2, option 3, etc. The executable objects may be stored in an executable database and are applied to a profiler 15.

The next step (Step 2) is to execute each version or executable object of the program produced in Step 1, producing profile information for each version or executable. The user interface 17 provides a profiler 15 for extracting information related to said compiled application program from different compiling options, but using the same associated database, creating a profiler database 19 based upon said extracted information. The profiler 15 includes a simulator 15a to run the executable to provide a profile of the program. Each "profile" contains measured performance metrics for each function in the program (such as size, power consumed, and cycles consumed.). This is represented by the profile 1, profile 2, and profile 3 in FIG. 1 where profile 1 corresponds to the profile of run executable 1, profile 2 corresponds to the profile of run executable 2, profile 3 corresponds to the profile of executable 3. The profiler 15 may be a standalone simulator that records run-time information. An application program typically comprises several different functions that are used to perform the activities an application program is to perform. Each method of building an application can result in an executable version of the program application that exhibits different results, such as, code size and processor cycle count or speed behavior. When an application is built using several different methods, each resulting version of the application can be profiled by the profiler at the function level for its results over a consistent input set, collecting compiled code size and execution cycles for the functions of the program. Profile data collected by running the program and recording the time spent in each function can indicate which parts of the program deserve speed versus size consideration. The program must remain the same in all profile runs, and the profile runs must all do the same thing on all the same data. The resulting set of profile information describes the effects that each method has on each profilable function; for the example discussed above, this is in terms of code size and number of cycles executed for each function of the application program. If the method changes at the function level (from function to function), the term "solution" is used to represent a specific assignment of methods to each function of the compiled program.

As an example of profile data illustrated in the table below, a program consists of 3 functions F1, F2, and F3. When compiled with options set 1, the functions have the respective sizes of A1, A2, and A3, and the execution times of B1, B2, and B3. When compiled with options set 2, the 3 functions have respective sizes C1, C2, and C3, and respective execution times of D1, D2, and D3. The compilation of this program by the system will create two profile sets, corresponding to the two options sets (options 1 and options 2).

Profile 1 consists of the following data:
F1: size=A1 cycles=B1
F2: size=A2 cycles=B2
F3: size=A3 cycles=B3
Profile 2 consists of the following data:
F1: size=C1 cycles=D1
F2: size=C2 cycles=D2
F3: size=C3 cycles=D3

|    | Options 1 | | Options 2 | |
| --- | --- | --- | --- | --- |
|    | Size | Cycles | Size | Cycles |
| F1 | A1 | B1 | C1 | D1 |
| F2 | A2 | B2 | C2 | D2 |
| F3 | A3 | B3 | C3 | D3 |

While the example has only three functions in actual practice the program may have many more functions and run many profiles. With just four functions and two profiles or options there are 16 possible combinations. An application with only 165 functions and three profiles or three options would have 10 to the power of 79 possible combinations. It is easy to see that selecting the best combination can take lots of time and effort. Applicant's present invention provides a method and system to assist in that selection.

Every individual function trade-off can be considered to produce a solution. All possible permutations of trade-offs over the whole set of profile runs may be saved in memory or at least the most desirable. The profile data is stored in memory 19 of FIG. 1.

Step 3, provides a solution solver 21 for generating estimated solutions from said profiler database. A solution engine 21 uses this profiling information to evaluate the permutations of varying methods at the function level to compute all of the useful solutions. A solution is "useful", if no other solution results in a version of the application that is better optimized for a specific result, such as, for example, faster and smaller in code size than it. The user interface 17 creates a solution database 23 based upon solutions from said solver 21 from extracted information. The solver or solution engine 21, uses linear programming and heuristics to reduce the total number of permutations of option sets per function to an "efficient frontier" which is the set of potential solutions for which there are no other solutions that are better in all performance metrics, such as size and speed. The "efficient frontier" represents the best set of compile options for the set of functions to produce the best set of potential solutions. The fundamental unit in the solver 21 is the function record, which contains the time and size information for a single function in a single profile. Each profile is represented as a sequence of function records F1, F2, F3, etc. one for each function. The solver 21 operates on a matrix of function records, each row containing the records for one function, each column containing the records for one profile. To form a solution, the solver 21 picks one function record from each row; choosing from different columns implements the node interchange.

The solver process has two stages. The first is generating possible solutions and the second is filtering the possible solutions. The process of forming the solution curve is essentially a search problem; it divides nicely into generating solution from the function matrix, and evaluating them to determine which are useful. We want to avoid brute-force generation, since the numbers are extremely large. The vast majority of these solutions will be useless. It's important both to reduce the number generated and to efficiently discard the useless ones.

We can reduce the space considerably by an initial filtering step. One way is to convert the function matrix into a two-column matrix where one column contains the fastest version of each function and the other contains the smallest, thus distilling the essential trade-off of time and size. This two-column matrix is most useful when considering the evaluation process as a 0–1 integer programming problem, but is less useful for producing the entire solution curve.

A second method is to remove from each row all function records that are themselves useless. In many instances, records will be identical (and the duplicates can be removed) or one or more will be clearly inferior (their time and size are both greater than the others). This filtering method mirrors the evaluation of solutions: only points on the lower contour of the speed/size plot are retained.

Figure 3A:
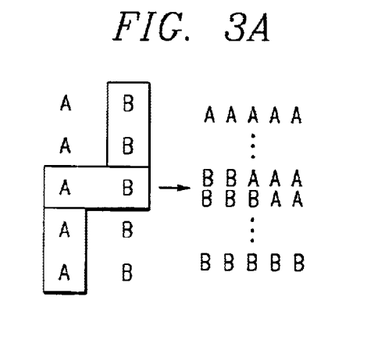
FIG. 3 illustrates linear solution generation.
Figure 3B:
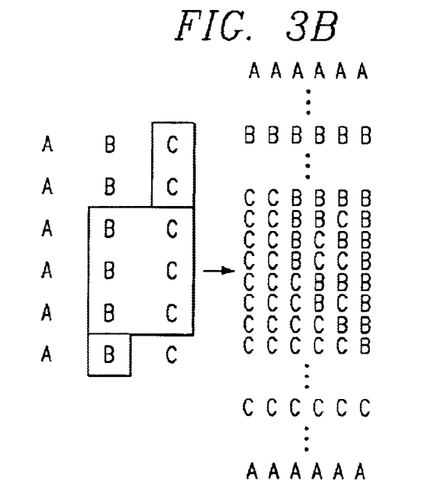

Following the initial filtering, solutions can be generated in several ways. The best heuristic for our purposes we call "linear approximation" (FIG. 3). The linear solver 21 sorts the rows of the filtered matrix and then moves a small window down the rows, only considering possibilities that involve choices within the window. In its simplest form, with two columns and a one-row window, the choices would be to take the function in column A or in the one in column B; after the choice, the choice is made on the next row, and so on. Rows above the window are left in column B, rows below it in column A. It is linear because the number of solutions generated is directly proportional to the number of rows in the matrix.

Figure 4:
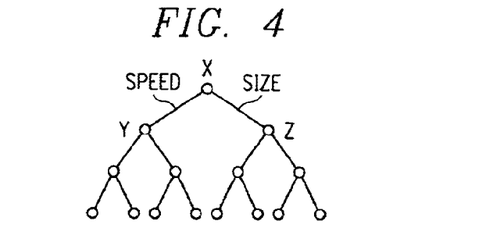
FIG. 4 illustrates search tree.

In actual use, the window is eight rows so we have 256 choices at each step; there may be more than two columns so we use each pair of columns in turn; and there are two or more sort functions so we make that many passes over the entire matrix. All these details serve to generate permutations that are likely to be useful, without generating all of them. The permutations—the solutions—are filtered to collect a list of useful solutions, which in practice is very nearly the same as the list formed by an exhaustive approach. The filtering process, both the initial filter and the solution filter, uses a binary search tree. For the five profiles such as Option 1 for speed, Option 2 for size, Option 3 for minimum size, Option 4 for maximum speed, and Option 5 for aggressive speed. The two column pair choices are for example Option 1 and Option 2, Option 2 and Option 3, Option 3 and Option 4, Option 4 and Option 5; and Option 5 and Option 1. The results are then filtered by comparing the set of solutions in a search tree from the pairs of options. A binary search tree is illustrated in FIG. 4. An attempt is made to insert each candidate solution into the tree at point X; the sorted nature of the tree allows efficient determination of whether the candidate should be included, and when entries already present should be removed. At the start point X, if the solution is slower and bigger than the prior solution at point X, the candidate solution is discarded. If the solution is faster and smaller than the prior solution at point X, point X is discarded, the two subtrees are combined (for example, by attaching point Y at the bottom leftmost point of the Z subtree), and the process is repeated at the new point X (for example, the former Z). If the solution is only faster than the prior solution at point X, it moves down to the left to point Y; if it is only smaller, it moves down to the right to point Z. In either case, the process is repeated at the new point—if slower and bigger, discard; if faster and smaller, delete and combine; if faster, move left, if slower, move right. If the solution reaches the bottom of the tree, it is attached as a new entry. When all candidate solutions have been inserted into the tree, the tree contains all useful entries and the others have been discarded. The process is efficient because it is logarithmic: the typical candidate is compared against no more than log-to-base-2 of the number of entries in the tree, a number much smaller than the number of candidates.

The user interface 17 of the present invention includes five different modules or windows. These five modules are solution space module 17a, a Zoom window module 17e of the solution space window, a solution point module 17b, a solution point override module 17c and an extended solution point module 17d.

Step 4 displays the "efficient frontier" solution curve graphically, and allows the user using the user interface 17 to select a solution point in one of two ways. The user interface 17 includes a graphical user interface and a display 18 for generating an "efficient frontier" plot or a graph window with cycles being on the vertical axis and bytes being on the horizontal axis. The result is a concave curve plot on the display that explicitly represents the candidate performance metric tradeoff (see FIG. 5). Each point on the curve represents one potential solution, which is the set of compiler options for each function in the program that can be used to generate an executable that exhibits that performance tradeoff. The overall performance of each useful solution may then be graphed. Useful solutions are plotted in between and will form a solution space curve. The solution space module receives a list of useful solutions from a solution solver 21. Each solution contains a list of all profitable functions, and for each function, its resulting performance metric (such as code size and number of processor cycles) and what method of compiling the function was used to obtain those results. An overall performance for an application program is computed by summing up the performance of each function and then adding in any unprofiled performance. Unprofiled performance for a function may be estimated based upon the unprofiled performance of the original application executables initially profiled. The unprofiled performance of the original executables may differ slightly due to effects from alignment, for example, and in this case, the average is taken. The overall performance of each useful solution may then be graphed. Useful solutions are plotted in between and will form a solution space curve.

Figure 5:
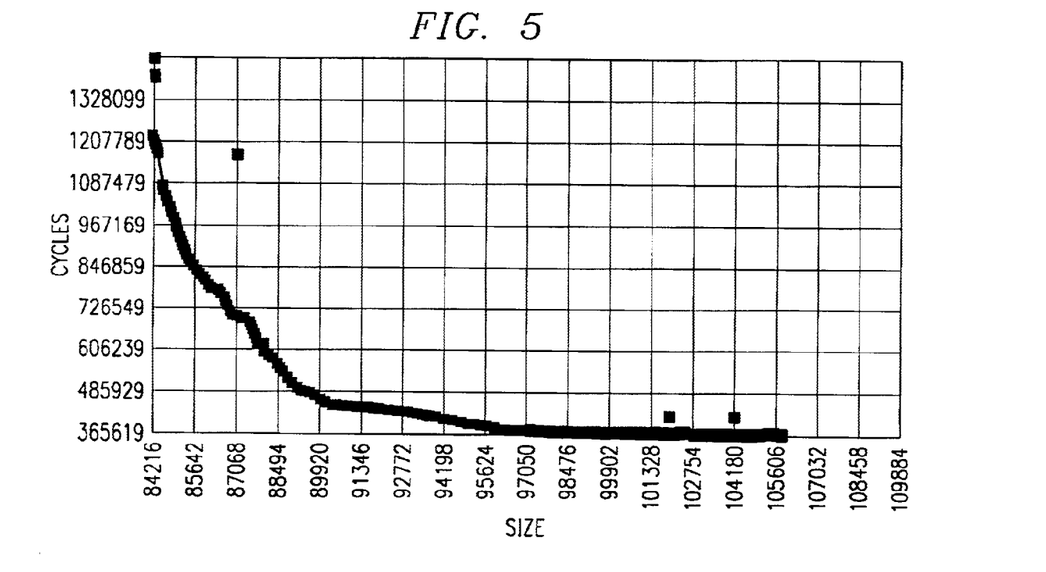
FIG. 5 illustrates a chart of speed (cycle) versus size (bytes)

The main window of the solution space module 17a of the user interface 17 is the "solution space" window depicted in FIG. 5. It is presently preferred to be a 2 dimensional graph with the results for one performance metric option, such as a code size, increasing along the X axis and the results for a second performance metric, such as cycle count or speed, increasing along the Y axis. Thus, for example, the upper left corner represents the smallest code size solution for an application and the lower right represents the fastest (fewest processor cycles) solution curve. Useful solutions are plotted in between the smallest code size and the fastest and form the solution space or efficient frontier curve. By plotting and displaying the solution space curve, the user is allowed to visualize and therefore understand what performance metric tradeoffs, such as code size and speed, are possible for that application. The display could display selected results in red for the results for options 1, 2, 3 etc. The "efficient frontier" could be in blue.

Figure 6:
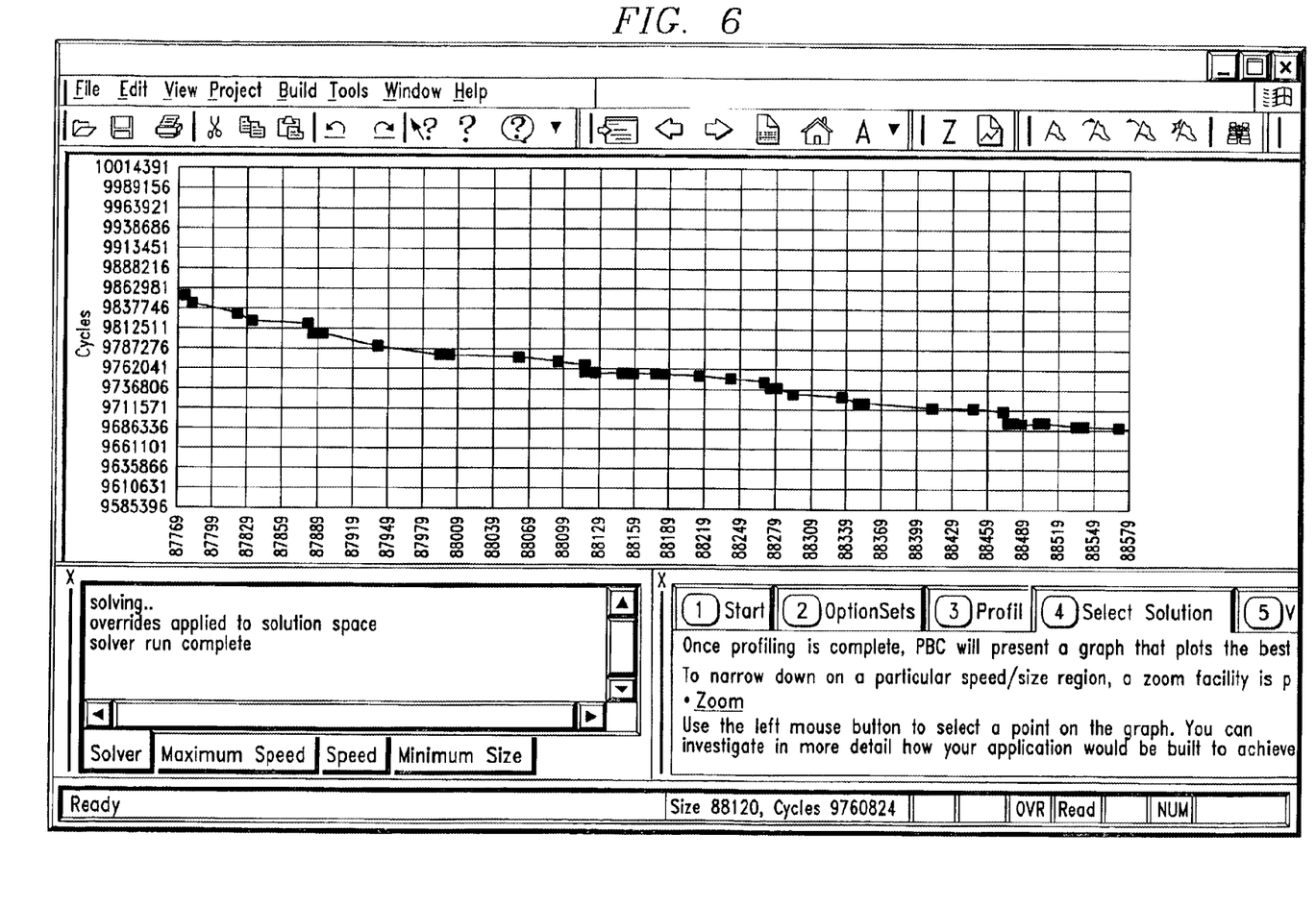
FIG. 6 illustrates a zoom area expansion of part of the chart of FIG. 5.

If the solution space contains many useful solutions, the curve will not look like a series of points, but rather like a continuous blue line. A zoom window facility 17e is provided to allow the user to zoom in on an area of the curve of interest. This zoom facility 17e allows the user to see an expanded view of a series of contiguous solution points. The expanded view of a series of contiguous solution points in the curve of FIG. 5 is illustrated in FIG. 6. The zoom can be over an area of interest and the user can select the best solution point in that area.

Holding the mouse pointer over any solution point in the graph will display the exact code size and speed characteristics for that solution. The original versions of the application that were built to generate the profiling information may also be plotted, but in some unique representation, such as, in a different color. This helps the user understand the improvements that this process can bring to an application.

Step 5 is selecting the solution point by selecting any plotted point with the mouse pointer. The selection method 1 is for the user to browse the "efficient frontier" curve and simply select a point on the zoom facility for example through a graphical user interface and the mouse pointer. Selection method 2 allows the user to specify an upper bound on any performance metric such as cycle count or size and the system will choose a solution that maximizes the other performance metrics. Either selection method will visualize the exact option sets chosen for each function and provide an interactive mechanism for overriding any functions options set.

A next step 6 is determining if an override is applied.

If an override module is applied, the "efficient frontier" is recomputed by simply rerunning the solver (Step 3). The compilation/execution/profiling steps need not be iterated. The user interface 17 presents the entire graph to the user and allows the user to select the appropriate solution.

Figure 7:
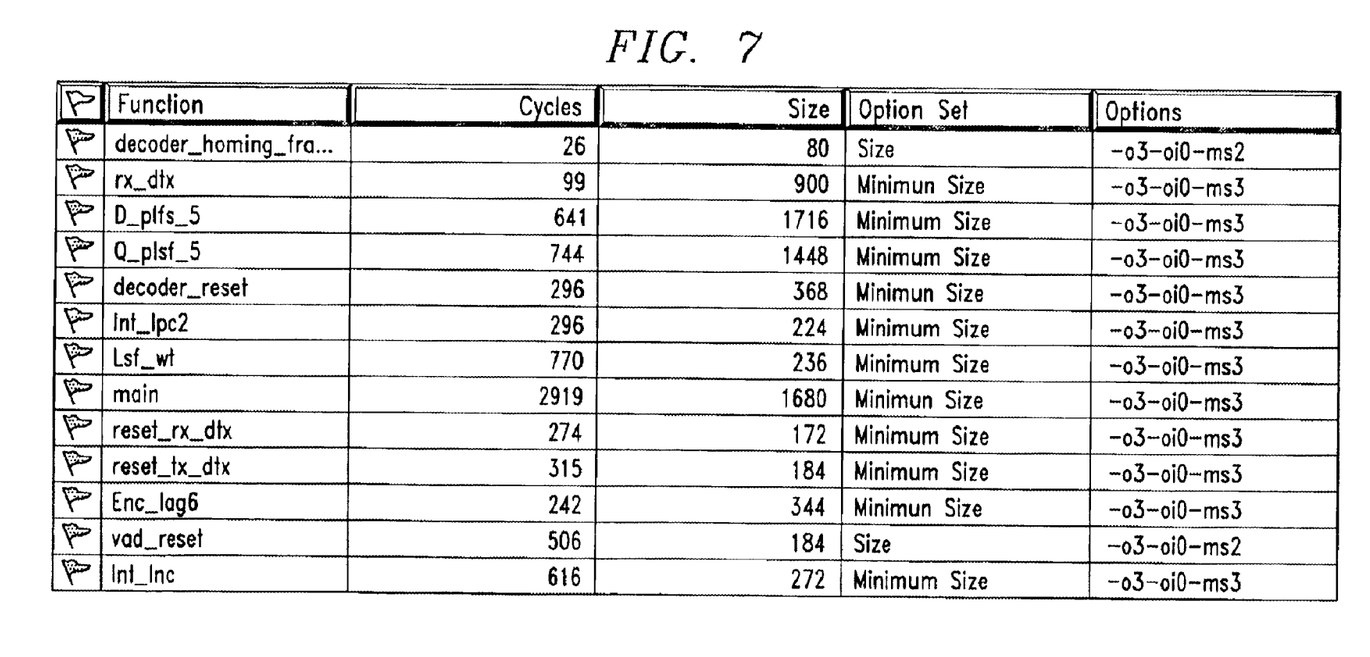
FIG. 7 illustrates a solution point window.

A solution area or point may be selected by highlighting any plotted point with the cursor, using the mouse. Alternatively, the user can input a maximum cycle count or maximum code size, and the smallest or fastest, respectively, solution that meets that constraint will be chosen. A solution point module 30 is provided to allow for the presentation of a single solution point from the solver 21. Once a solution point is found that meets the user's code size and speed requirements, a module is provided to view the details of the selected solution point. The window for this module displays a table with a listing of each function of the application along with columns for its performance (code size and cycles) and the method used to build it, preferably in tabular form. The "solution point" window of FIG. 7 contains this information. The column on the far left lists the functions. For each function, there are columns for the function's cycle count, size and method used to build the function (OptionSet and Options). Note the main function has the function set for minimum size in the example. The data within each column can be sorted. This allows the user the flexibility to see what functions have the greatest cycle count or code size.

Once a solution point is selected, the solution point module also exports the necessary information to compile the application program to achieve the results similar to those of the selected solution, via a makefile, preferably on a function-by-function basis.

A next step 6 is determining if an override is to be applied. The system has the added flexibility provided by allowing the user to "override" the method used to build any function. The user may override a function (Step 7) by selecting a particular method that should always be used in building the function or by giving a rule that tells the solution engine how to pick the method. A typical rule is to pick the method of building the function that results in the fastest version or the smallest version. A rule is dynamically applied each time the solution engine or solver is used and therefore can select a different method of building the function, if the profile data changes. The profile data is a set of inputs and conditions supplied to the application program to simulate its actual operation.

If an override module is applied, the "efficient frontier" is recomputed by simply rerunning the solver (Step 3). The compilation/execution/profiling steps need not be iterated. The user interface 17 presents the entire graph to the user and allows the user to select the appropriate solution. From the original methods used to build and profile the application, the solution solver obtains data on how each method affects the performance of each function. A solution point override module provides the user a way to display and control what method is employed on a function-by-function basis. When a method is bound to a function via a user selection, the override window removes from the solver's data all of the methods for that function except the bound one. Thus, the solver always chooses that one and only one method of building that function. When an override "rule" is applied to a function by a user, the override window does the same thing as above, but will reevaluate which method to keep each time the solver is invoked.

Figure 8:
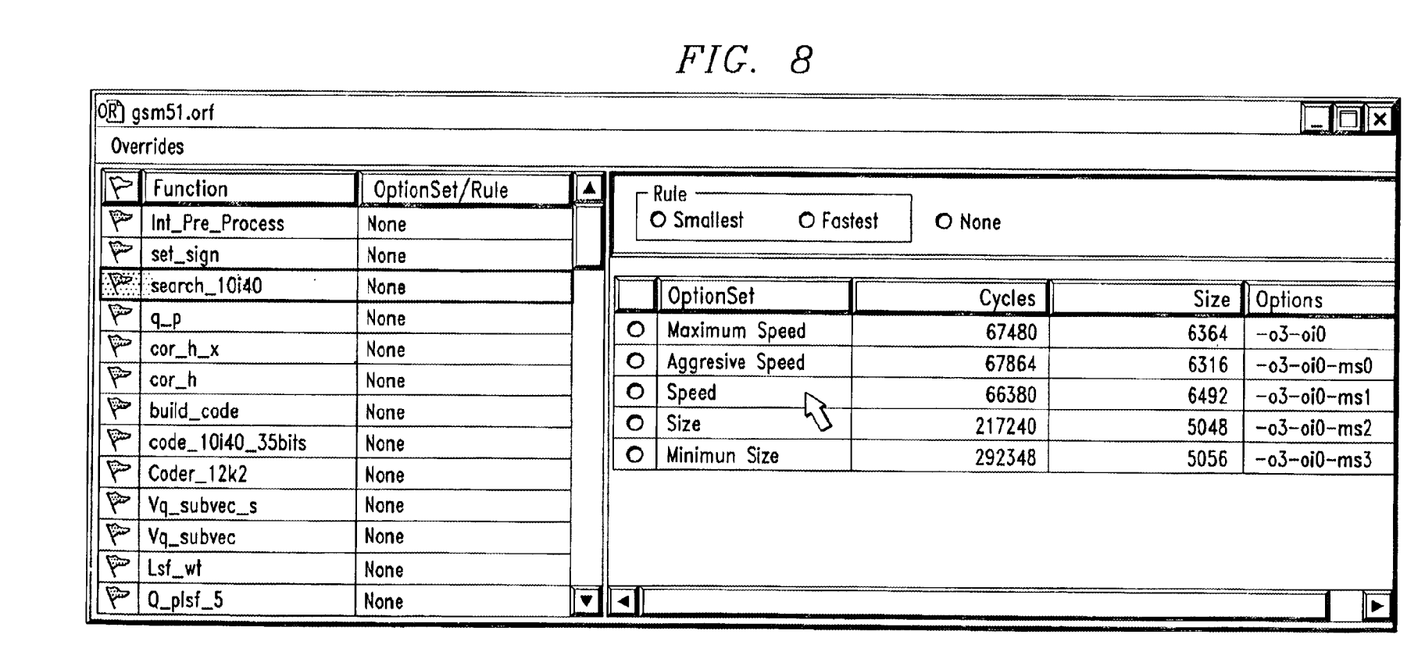
FIG. 8 illustrates an override window.

The override rule is useful if the profiling training set isn't perfectly representative and it is known that a particular function either is or is not speed critical. The binding of a method to function is useful if the function isn't invoked during profiling and so no cycle count information is available from which to choose the best method. FIG. 8 illustrates an override window. On the left column is the list of functions and on the right is the rule information with selections for maximum speed, aggressive speed, speed, size and minimum size and the estimated cycles and size.

Step 8 writes the selected solution to a persistent database 25 containing directives to the compiler 13 that control options to be applied individually to each function.

Step 9 compiles the program using the directives database created in the previous steps. This results in an executable that is then run and profiled to collect actual performance metrics. The resultant performance metrics are presented to the user and compared to the predicted performance metrics. In step 9 the compiler uses the build method recorded from step 5 in any subsequent builds of the program or until the user chooses another build method either by rerunning the system or deleting the database.

The useful solutions set database generated by the solution engine are only estimations, based upon the profiling information obtained from the different versions of the application actually built. They are not actually built or profiled. Rather, it is assumed that each function will behave identically regardless of surrounding code, and "projects" the performance of a solution point based upon the performance of each function from the profile information. This assumption isn't precisely correct because of alignment padding, no operations (NOPs) between fetch packets, etc. Therefore, the solution points are estimates and can differ from the actual performance. The user interface 17 of the present invention preferably allows the user the ability to actually build the solution point selected and compare the actual results with results that were graphed. An "extended solution point" window Step 10 depicted in FIG. 9 will compare the actual with the estimated performance.

The extended solution point module takes the "makefile" generated by choosing a solution point and feeds it to the compiler to actually build the solution selected. The profiler then profiles the resulting executable, collecting the same profile information as for the original executables. It then presents an overall view and a function level view.

The overall performance of the built solution is computed in the same manner as described in the solution space module. This overall performance result may be textually compared to the overall performance of the point chosen in a solution space module. In addition, each function may be listed and along with it, both the actual (profiled) and estimated (plotted) performance of that function listed in a tabular format, along with columns that contain the difference between the actual and estimated results.

Figure 9:
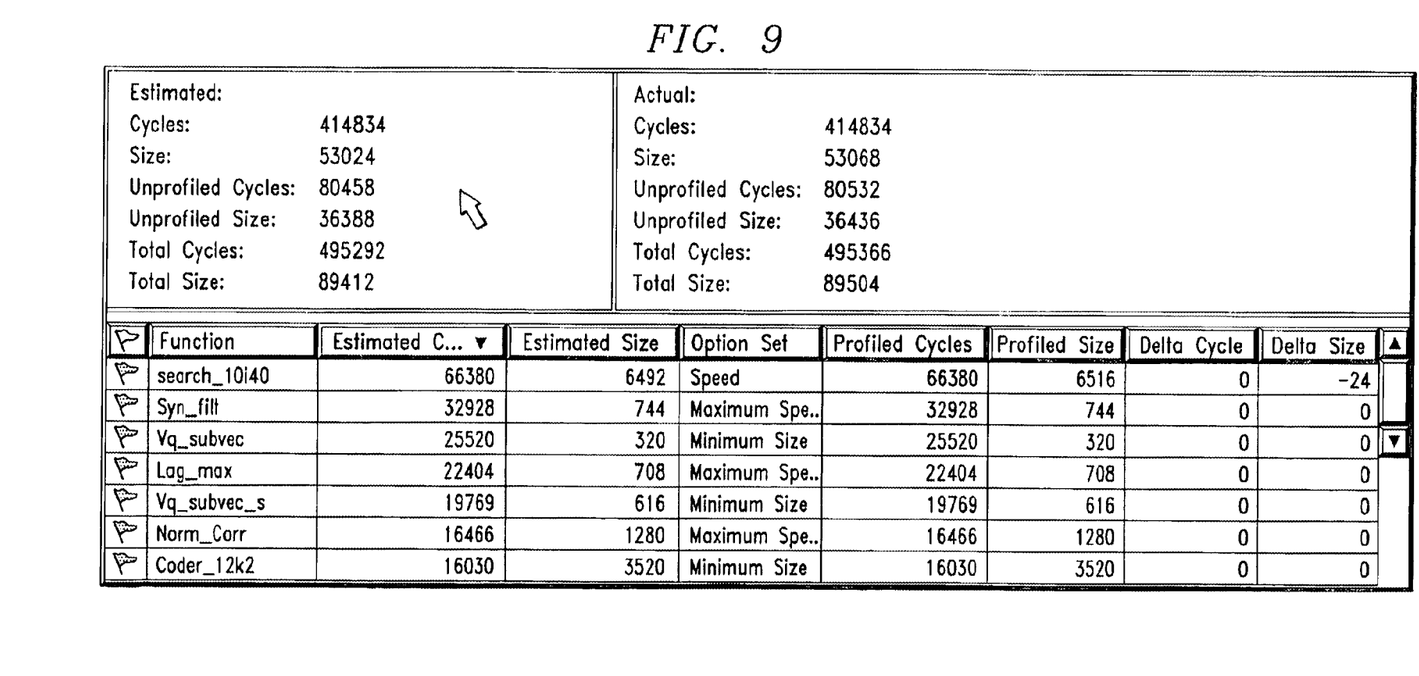
FIG. 9 illustrates extended solution point window.

Optionally, it will also display a function table containing columns for actual code size, actual cycle counts, estimated code size, estimated cycle counts, delta code size (between actual and estimate) and delta cycle counts. FIG. 9 illustrates on the top left the estimates of cycles, size, unprofiled cycles, unprofiled size and the total size and cycles. The top right presents the same information for actual or profiled cycles, size, etc. On the bottom left column is the listing of the functions. The next columns to the right is presented the estimated cycles, estimated sizes, the OptionSet, the actual cycles, actual size and the error or delta for each function. Note that for the top function the size error because the actual size was larger than estimated.

If the solution is acceptable to the user, the solution is installed as the default build method for the program.

Otherwise, the user iterates from step 4.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for compiling an application program, comprising: compiling said application program with a first set of compiler options in a manner that optimizes one application characteristic, subject to limits on another application characteristic to provide a first executable, compiling said application program with a second set of compiler options in a manner that optimizes said other application characteristic, subject to limits on said one application characteristic to provide a second executable, generating profile information from said first and second executables, generating and displaying sets of optimal solutions from said profile information wherein the sets have methods of compiling at the function level in a solution space generator, and automatically selecting and applying function level compiler options for said application program based upon selected optimal solutions so as to optimize said application program.

2. The method of claim 1, wherein said first set of options is for best computation time.

3. The method of claim 2, wherein said second set of options is for best code size.

4. The method of claim 1, further comprising the step of analyzing said profile information against user supplied application characteristic constraints for selecting said compiler options by function.

5. A method for compiling an application program comprising the steps of: compiling said application with a different set of compiler options that optimizes one application characteristic, subject to limits on another application characteristic to provide two or more executables; generating profile information from said executables; applying said profile information to a solver; generating sets of useful solutions from said solver wherein the sets have methods for compiling each function; and selecting a solution for said application program using said useful solutions for subsequent compiling of said application.

6. The method of claim 5 wherein said selecting step inludes displaying said useful solutions.

7. The method of claim 5 wherein said generating sets of useful solutions step includes generating an efficient frontier curve of optimum solution points and displaying said curve of solution points.

8. The method of claim 7 wherein said generating sets of useful solutions step includes a zoom window of a section of said curve of solution points.

9. The method of claim 5 wherein said generating sets of useful solutions step includes linear programming and heuristics to reduce the number of permutations of option sets per function.

10. The method of claim 5 wherein said generating solutions step generates possible solutions and filters out the possible solutions that are not better in at least one application characteristic.

11. The method of claim 5 wherein said generating solutions step includes a search tree wherein each candidate is applied to a node and compared to the solution at the node and if faster in time and smaller in size replacing that candidate at the node, if neither faster nor smaller in size discarding the candidate, if faster only processing down the tree in one direction and if smaller only processing down the tree in a different direction.

12. The method of claim 5 wherein the step of selecting a solution includes displaying solution points on said solution point curve illustrating the application characteristic tradeoff that can be made by compiling each function as prescribed by said solution.

13. The method of claim 5 including means for overriding the solvers choice of compiler options for a particular function.

14. The method of claim 12 including the step of compiling the application using chosen solution's set of function options.

15. The method of claim 5 wherein the step of selecting a solution includes applying a user constraint to one application characteristic and automatically selecting the solution point that meets said constraint and optimizes another application constraint.

* * * * *